Dec. 15, 1953  C. W. NEILSEN  2,662,359
TRACTOR MOUNTED BUCK RAKE
Filed Dec. 26, 1951  2 Sheets-Sheet 2
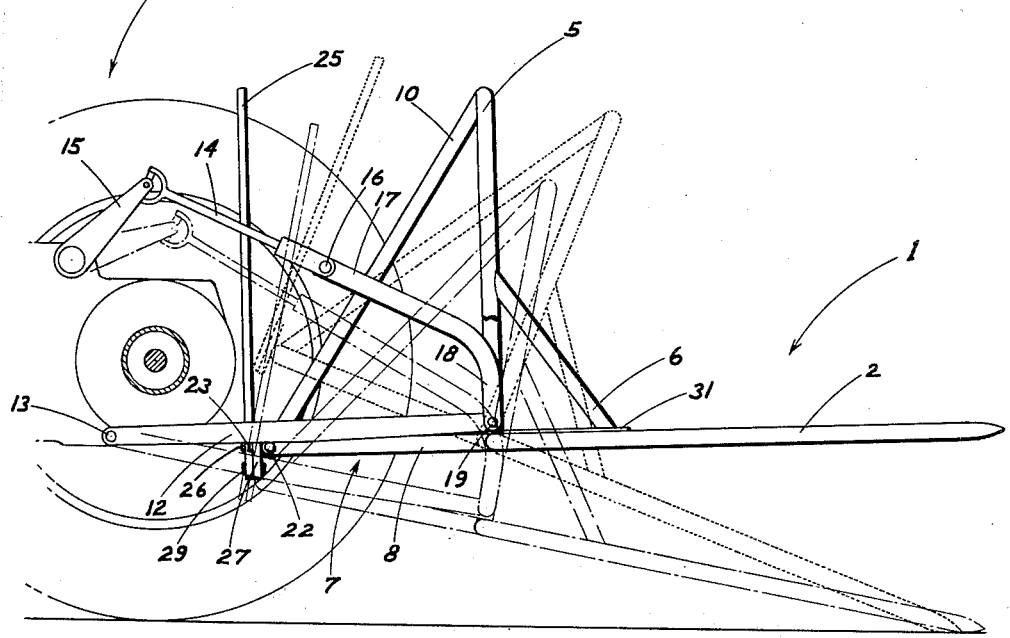
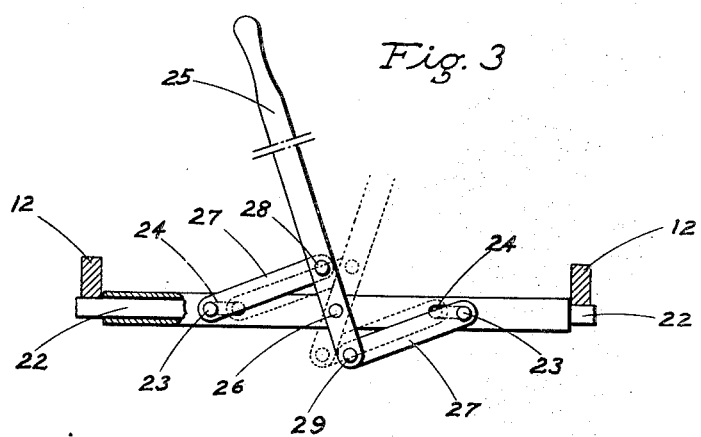
INVENTOR
Charles W. Neilsen
BY Webster & Webster
ATTORNEYS Patented Dec. 15, 1953

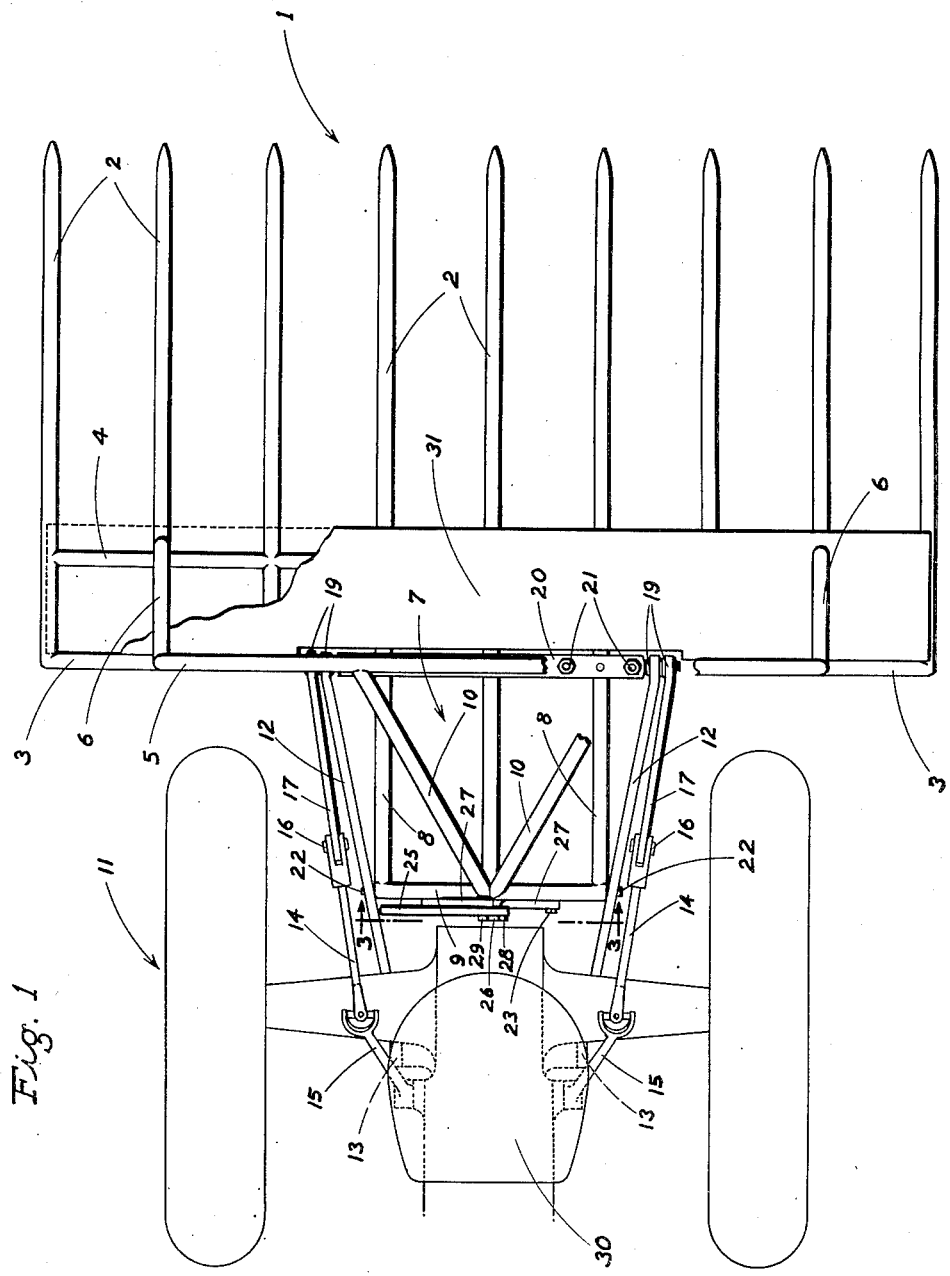

2,662,359

UNITED STATES PATENT OFFICE 2,662,359

TRACTOR MOUNTED BUCK RAKE

Charles W. Neilsen, Sacramento, Calif.

Application December 26, 1951, Serial No. 263,138

11 Claims. (Cl. 56—27)

This invention relates generally to agricultural implements, especially a hay rake.

In particular the invention is directed to, and it is a major object to provide, a novel tractor-mounted buck rake; the buck rake being mounted at the rear of the tractor and supported in vertically adjustable relation by a power lift-type hitch on the tractor.

Another important object of the invention is to provide a tractor mounted buck rake, as above, wherein the rake is pivotally mounted in connection with the power lift type hitch on the tractor, but is provided with releasable means normally preventing downward tilting of the rake relative to said hitch. Upon release of such means the buck rake is tiltable downwardly at the rear end for discharging a load.

Still another object of the invention is to provide a tractor-mounted buck rake, as in the preceding paragraph, wherein said releasable means, to permit of tilting of the rake, is accessible to the operator from the seat of the tractor.

An additional object on the invention is to provide a buck rake which can be readily attached to, or detached from, the power lift-type hitch of a tractor with a minimum of time and effort.

A further object of the invention is to provide a tractor-mounted buck rake which is sturdy in construction; capable of long use without requiring any substantial maintenance or repair; and very convenient to manipulate between its working positions.

A still further object of the invention is to provide a tractor-mounted buck rake which is designed for ease and economy of manufacture.

It is also an object of the invention to provide a practical and reliable tractor-mounted buck rake, and one which is exceedingly effective for the purpose for which it is designed.

These objects are accomplished by means of such structure and relative arrangement of parts, as will fully appear by a perusal of the following specification and claims.

In the drawings:

Fig. 1 is a plan view of the buck rake, partly broken away, as mounted on a tractor.

Fig. 2 is a side elevation of the same partly in section and broken away; the buck rake being shown in its carrying position in full lines; in its loading position in broken lines; and in its dumping position in dotted lines.

Fig. 3 is an enlarged transverse section on line 3—3 of Fig. 1.

Referring now more particularly to the characters of reference on the drawings, the buck rake unit is indicated generally at 1; such unit comprising a plurality of transversely spaced, rigid, longitudinally rearwardly projecting rake bars 2 fixed together at the front portion by rigid cross rods 3 and 4. At their rear or pick-up ends the rake bars 2 are blunt pointed, as shown.

An upstanding back frame 5 extends transversely of the rake unit 1 directly above, and is fixed to, the cross rod 3, being stabilized by rear diagonal braces 6. The rake unit 1 is formed, at the front and centrally of its sides, with a forwardly projecting tongue or box frame, indicated generally at 7, and such box frame includes side beams 8 and a cross beam 9. Front diagonal braces 10 connect between the forward end of the box frame 7 and the top of the upstanding back frame 5.

The rake unit 1 is adapted to be coupled in draft and lift relation to a power lift-type hitch on the rear of a tractor, the latter being indicated generally at 11, and such hitch including transversely spaced bottom links 12 which project rearwardly, in vertically swingable relation, from pivots 13 on the tractor. Above the bottom links 12 the hitch includes corresponding top lift links 14 connected, at their upper ends, to the outer ends of power actuated lift arms 15 on the tractor.

The bottom links 12 and the top lift links 14 have some rearward divergence, and said latter links are pivoted at their rearmost ends, as at 16, to the adjacent ends of rearwardly and downwardly extending extension links 17 which have a substantially perpendicular lower end portion 18.

The extension links 17 at their lower ends, and the bottom links 12 at their rear ends, are pivoted in common, as at 19, to the adjacent ends of a cross bar 20.

The cross bar 20 rests atop the cross rod 3 of the rake unit 1 centrally of its sides, and said cross bar 20 is affixed to the cross rod 3 by tie bolts 21.

With the rake unit 1 thus connected to the power lift type hitch on the tractor, the box frame 7 projects forwardly to a front end termination adjacent, but vertically swinging between, the transversely spaced bottom links 12.

In order to normally maintain the rake unit 1 against downward tilting about the pivots 19 and from the transport position, as in full lines in Fig. 2, the following releasable holding means is provided:

The front cross beam 9 is tubular, and plungers 22 slidably engage in opposite end portions of said cross beam 9; the plungers 22 normally projecting out from the adjacent ends of said cross beam 9 and engaging in abutment beneath the related bottom links 12. As a consequence the box frame 7 is prevented from upward swinging between the bottom links 12, and the rake unit 1 cannot tilt downwardly at its rear end.

The plungers 22 are adapted to be retracted into the cross beam 9 so as to permit, at the selection of the operator, the box frame 7 to swing upwardly between the bottom links 12 so that the rake unit 1 may tilt downwardly at the rear to a discharge position, as in dotted lines in Fig. 2; the plungers 22 being actuated by the following mechanism:

Adjacent their inner ends the plungers 22 are each fitted with a lateral pin 23 which projects through a corresponding longitudinal slot 24 in the tubular cross beam 9. An upstanding, laterally swingable hand lever 25 is pivoted, adjacent but short of its lower end, as at 26, to the cross beam 9 centrally of the ends of the latter. Actuating links 27 are pivotally connected between the projecting portions of the pins 23 and the lever 25 at points 28 and 29 above and below the shaft 26. With this arrangement, swinging of the lever 25 in one direction, as in full lines in Fig. 3, projects the plungers 22 beneath the bottom links 12, while swinging of the lever in the opposite direction, as in dotted lines in said figure, retracts the plungers 22 into the cross beam 9 for the recited purpose.

As the lever 25 upstands immediately rearwardly of the tractor seat 30, it is readily manually accessible to the tractor operator.

When the described tractor-mounted buck rake is in use, the rake unit 1 is lowered by the power lift-type hitch on the tractor to the loading position shown in broken lines in Fig. 2, and then the tractor is backed up so that the rake bars 2 run under the load.

Then the hitch on the tractor is actuated to cause the rake unit 1 to lift to the transport position shown in full lines in Fig. 2, and the tractor is run forward, transporting the load to the point of discharge.

At the point of discharge the operator swings the lever 25 in a direction to retract the plungers 22, whereupon the rake unit 1 tilts downwardly, as in dotted lines in Fig. 2, dumping the load, and which dumping may be facilitated by slight forward movement of the tractor. Thereafter, by appropriate lowering motion of the hitch on the tractor, followed by suitable manipulation of the lever 25, the plungers 22 are reengaged beneath the bottom links 12.

If desired, the rake unit 1 may be fitted, at the forward portion, and on top of the rake bars 2, with a full width top plate 31 which tends to support the load directly ahead of the upstanding back frame 5.

With the described tractor-mounted buck rake hay or the like can be readily and conveniently picked up, transported, and unloaded; all without the operator leaving his seat on the tractor.

When the buck rake is not in use it may be conveniently removed from the tractor by the simple expedient of detaching the pivots 16 and 19.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desirable:

1. A buck rake, for rear mounting on a tractor having a power lift type hitch embodying transversely spaced top links and transversely spaced bottom links, comprising a rigid rake unit projecting rearwardly from the hitch, said rake unit including transversely spaced, rearwardly projecting, longitudinal rake bars, means pivotally connecting corresponding top and bottom links to the rake unit at the front in common and in transversely spaced relation whereby the rake unit is tiltable downwardly at the rear, and releasable means between the rake unit and hitch normally operative to hold said rake against such downward tilting motion.

2. A buck rake, as in claim 1, in which said releasable means comprises a rigid forward projection on the rake unit, stop means mounted on said projection for movement between a position below a bottom link and a position clear thereof, and hand means operative to shift said stop means between said positions.

3. A buck rake, as in claim 2, in which said rigid forward projection is disposed centrally on the rake unit, and is of a width to permit of swinging of said projection upwardly between the bottom links.

4. A buck rake, for rear mounting on a tractor having a power lift type hitch embodying transversely spaced top links and transversely spaced bottom links, comprising a rigid rake unit projecting rearwardly from the hitch, said rake unit including transversely spaced, rearwardly projecting, longitudinal rake bars, means pivotally connecting corresponding top and bottom links to the rake unit at the front in common and in transversely spaced relation whereby the rake unit is tiltable downwardly at the rear, a rigid forward projection on the rake unit, and stop means between said projection and at least one of the bottom links operative to prevent downward tilting of the rake unit at the rear.

5. A buck rake, as in claim 4, in which said stop means is retractable to a position clear of the bottom links; and the projection is disposed to swing vertically between said bottom links.

6. A buck rake, for rear mounting on a tractor having a power lift type hitch embodying transversely spaced top links and transversely spaced bottom links, comprising a rigid rake unit projecting rearwardly from the hitch, said rake unit including transversely spaced, rearwardly projecting, longitudinal rake bars, a relatively short cross bar fixed centrally on said rake unit at the front, means pivotally securing corresponding top and bottom links in common to the related ends of said cross bar whereby the rake unit is tiltable downwardly at the rear, a rigid forward projection on the rake unit; said forward projection being of a width and disposed to permit upward swinging between the bottom links, and releasable stop means between said projection and at least one of the bottom links operative to prevent downward tilting of the rake unit at the rear.

7. A buck rake, for rear mounting on a tractor having a power lift type hitch embodying transversely spaced top links and transversely spaced bottom links, comprising a rigid rake unit projecting rearwardly from the hitch, said rake unit including transversely spaced, rearwardly projecting, longitudinal rake bars, means pivotally connecting corresponding top and bottom links to the rake unit at the front in transversely spaced relation whereby the rake unit is tiltable downwardly at the rear, a rigid frame projecting forwardly from the rake unit centrally of its sides, said projecting frame being of a width to swing between the bottom links, laterally shiftable plungers mounted on the projecting frame adjacent the front thereof for shifting motion between a position abutting corresponding bottom links from below and a position clear thereof, and means operative to so shift said plungers simultaneously.

8. A buck rake, as in claim 7, in which said last named means includes an upstanding laterally swingable lever pivoted on the projecting frame, and opposed action links pivotally connected between the lever and corresponding plungers.

9. A buck rake, as in claim 8, in which the projecting frame includes a tubular front beam, the plungers being slidable in opposite end portions thereof, said front beam having longitudinal slots alongside the plungers, pins on the plungers extending through the slots, the lever being pivoted intermediate its ends on the cross beam intermediate the slots, and said opposed action links being pivotally connected between the pins and lever at points above and below the lever pivot.

10. A buck rake, for rear mounting on a tractor having a power lift type hitch embodying transversely spaced top links and transversely spaced bottom links, comprising a rigid rake unit projecting rearwardly from the hitch, said rake unit including transversely spaced, rearwardly projecting, longitudinal rake bars, a relatively short cross bar fixed centrally on said rake unit at the front, the top links of the hitch being initially relatively short, rearwardly and downwardly inclined link extensions connected to the rear ends of the top links, means pivotally connecting the rear ends of corresponding bottom links and top link extensions in common to the related ends of the cross bar, and means engaged between the rake unit and hitch normally operative to prevent downward tilting of the rake unit about said pivotal connections.

11. A buck rake for rear mounting on a tractor having a power lift hitch which includes transversely spaced bottom draft links, said rake comprising a rigid rake unit, means pivoting the unit at its forward end on the links at their rear end, a projection frame rigid with the unit and extending ahead of the pivot means in laterally spaced relation to the links, a stop mounted on the projection frame and normally extending laterally under one of the links intermediate the ends thereof, and means mounted on the projection frame and operable at will to withdraw the stop from under said link.

CHARLES W. NEILSEN.

References Cited in the file of this patent

UNITED STATES PATENTS

| Number | Name | Date |
|---|---|---|
| 2,151,436 | Nicholas et al. | Mar. 21, 1939 |
| 2,271,591 | Hickman | Feb. 3, 1942 |
| 2,373,710 | Rutledge | Apr. 17, 1945 |
| 2,468,297 | Jones | Apr. 26, 1949 |
| 2,499,550 | Webb | Mar. 7, 1950 |